United States Patent
Quentin

(10) Patent No.: US 11,037,186 B2
(45) Date of Patent: Jun. 15, 2021

(54) METHOD FOR PROCESSING A PAYMENT TRANSACTION, CORRESPONDING PAYMENT KIOSK AND PROGRAM

(71) Applicant: Ingenico Group, Paris (FR)

(72) Inventor: Pierre Quentin, Enghien les Bains (FR)

(73) Assignee: INGENICO GROUP, Paris (FR)

( * ) Notice: Subject to any disclaimer, the term of this patent is extended or adjusted under 35 U.S.C. 154(b) by 433 days.

(21) Appl. No.: 15/873,330

(22) Filed: Jan. 17, 2018

(65) Prior Publication Data
US 2018/0204240 A1    Jul. 19, 2018

(30) Foreign Application Priority Data
Jan. 17, 2017   (FR) ...................................... 1750355

(51) Int. Cl.
*G06Q 30/02*    (2012.01)
*G06Q 20/18*    (2012.01)
(Continued)

(52) U.S. Cl.
CPC ..... *G06Q 30/0237* (2013.01); *G06F 16/9577* (2019.01); *G06Q 20/18* (2013.01);
(Continued)

(58) Field of Classification Search
CPC .......... G06Q 30/0237; G06Q 30/0238; G06Q 20/18; G06Q 20/3278; G06Q 20/352;
(Continued)

(56) References Cited

U.S. PATENT DOCUMENTS

| 9,424,568 B2 * | 8/2016 | Khan | ..................... G06Q 20/20 |
| 2004/0205491 A1 * | 10/2004 | Korala | ..................... G07F 19/20 715/208 |

(Continued)

OTHER PUBLICATIONS

Dynamic screen control accorind to amount of use of KIOSK, Jul. 1, 2002, IP.com.*

(Continued)

*Primary Examiner* — Arthur Duran
(74) *Attorney, Agent, or Firm* — David D. Brush; Westman, Champlin & Koehler, P.A.

(57) ABSTRACT

A method for processing a payment transaction implemented by an autonomous electronic device for processing payment transactions, called a payment kiosk. The payment kiosk includes a processor connected to at least one rendering device for rendering offers of items or services being vended and linked to at least one communications interface and to at least one contactless payment terminal. The a method includes: transmission, by a browser installed within the payment kiosk, of a request for obtaining contents made to a contents server; reception, by the browser, coming from the contents server, of an HTML content including at least one payment tag; processing the HTML content, delivering a view of the HTML content on the at least one rendering device; and preparation, by anticipation, by the contactless payment terminal, of at least one payment transaction as a function of data attributes of the at least one payment tag.

11 Claims, 3 Drawing Sheets

Figure 1A:
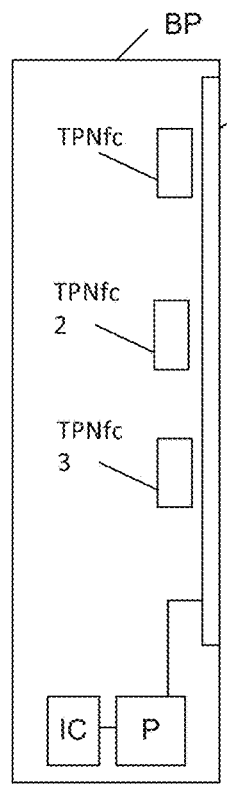

(51) Int. Cl.
*G06Q 20/32* (2012.01)
*G06Q 20/34* (2012.01)
*G06F 16/957* (2019.01)
*G07F 19/00* (2006.01)
*H04L 29/08* (2006.01)

(52) U.S. Cl.
CPC ....... *G06Q 20/3278* (2013.01); *G06Q 20/352* (2013.01); *G06Q 30/0238* (2013.01); *G07F 19/206* (2013.01); *G07F 19/211* (2013.01); *H04L 67/02* (2013.01)

(58) Field of Classification Search
CPC .. G07F 19/211; G07F 19/206; G06F 16/9577; H04L 67/02
See application file for complete search history.

(56) References Cited

U.S. PATENT DOCUMENTS

| | | | | |
|---|---|---|---|---|
| 2009/0119213 A1* | 5/2009 | Hammad | G06Q 40/12 | 705/44 |
| 2009/0210299 A1* | 8/2009 | Cowen | G06Q 20/405 | 705/13 |
| 2010/0138037 A1* | 6/2010 | Adelberg | G06Q 10/087 | 700/241 |
| 2010/0161466 A1* | 6/2010 | Gilder | G06Q 20/04 | 705/34 |
| 2010/0280958 A1* | 11/2010 | Hasson | G06Q 20/352 | 705/75 |
| 2011/0258122 A1* | 10/2011 | Shader | G06Q 20/20 | 705/67 |
| 2012/0036073 A1* | 2/2012 | Basu | G06Q 20/42 | 705/44 |
| 2012/0150669 A1* | 6/2012 | Langley | G06Q 20/102 | 705/16 |
| 2013/0006416 A1* | 1/2013 | Canter | G06Q 30/0241 | 700/236 |
| 2013/0054337 A1* | 2/2013 | Brendell | G06Q 20/12 | 705/14.27 |
| 2014/0138435 A1* | 5/2014 | Khalid | G06Q 20/352 | 235/380 |
| 2015/0081462 A1* | 3/2015 | Ozvat | G06Q 20/40 | 705/21 |
| 2015/0088698 A1* | 3/2015 | Ackerman | G06Q 30/0641 | 705/26.82 |
| 2015/0294431 A1* | 10/2015 | Fiorucci | G07B 15/02 | 705/13 |
| 2015/0348043 A1* | 12/2015 | Leger | G07C 9/29 | 705/44 |
| 2015/0356801 A1* | 12/2015 | Nitu | G07C 9/00904 | 340/5.61 |
| 2016/0104155 A1* | 4/2016 | McGaugh | G06Q 20/401 | 705/65 |
| 2016/0140567 A1* | 5/2016 | Hanna | G06Q 20/40145 | 705/44 |
| 2016/0171502 A1* | 6/2016 | Maenpaa | G06Q 20/327 | 705/44 |
| 2016/0259497 A1* | 9/2016 | Foss | G06F 3/0481 | |
| 2017/0061560 A1* | 3/2017 | Bullard | H04M 15/00 | |
| 2017/0323299 A1* | 11/2017 | Davis | G06Q 20/204 | |
| 2018/0121900 A1* | 5/2018 | Spice | G06Q 20/352 | |
| 2018/0204273 A1* | 7/2018 | Quentin | G06Q 20/352 | |
| 2018/0336548 A1* | 11/2018 | Crosby | G06Q 20/047 | |
| 2018/0337782 A1* | 11/2018 | Wu | H04L 9/14 | |
| 2019/0392427 A1* | 12/2019 | Wilson | G06K 19/067 | |

OTHER PUBLICATIONS

Guo, Design and Implementation of the KioskNet Sytem, Dec. 15, 2007, IEEE.*
English translation of the Written Opinion dated May 19, 2017, for corresponding French Application No. 1750355.
French Search Report dated May 19, 2017, for corresponding French Application No. 1750355, filed Jan. 17, 2017.
French Search Report dated May 23, 2017 for corresponding French Application No. 1750356.
English translation of the Written Opinion dated May 23, 2017 for corresponding French Application No. 1750356.
Office Action dated Aug. 21, 2020 from the United States Patent and Trademark Office, for corresponding U.S. Appl. No. 15/873,341.
Office Action dated Oct. 21, 2019 from the United States Patent and Trademark Office, for corresponding U.S. Appl. No. 15/873,341.
Office Action dated Apr. 3, 2020 from the United States Patent and Trademark Office, for corresponding U.S. Appl. No. 15/873,341.
Final Office Action dated Mar. 31, 2021 for corresponding pplication U.S. Appl. No. 15/873,341, filed Jan. 17, 2018.

* cited by examiner

METHOD FOR PROCESSING A PAYMENT TRANSACTION, CORRESPONDING PAYMENT KIOSK AND PROGRAM

1. FIELD OF THE INVENTION

The present technique relates to the management of non-monitored devices for supplying goods and services. Such devices are more usually called unattended devices. More particularly, the present invention relates to a method for processing a payment transaction by means of such devices. More particularly again, a method is presented for processing a transaction for the payment of goods and services as well as a device configured to implement such a method.

2. PRIOR ART

There are known devices, the purpose of which is to enable a user to make a purchase of goods and services independently, i.e. without supervision by a merchant. Such devices are also called unattended (i.e. non-monitored) devices. Examples are gas-station pumps, kiosks for issuing cinema tickets and so on. These kiosks, which are classic devices, are small sized and enable payments to be made by using a payment terminal that accepts several forms of payment, namely smartcard payment and magnetic card payment.

More recently, large-sized kiosks have appeared. These are generally multimedia kiosks comprising large screens (generally 46-inch-diagonal screens) which may be touch screens. Apart from being relatively costly, these kiosks present numerous technical problems. The first is that these multimedia kiosks are proprietary type kiosks. This implies that a multimedia kiosk comprises a set of components (screen, central processing unit, presence sensor, operating system, kiosk management application) that are arranged relative to each other to form the kiosk. Even more recently, multimedia kiosks embedding payment functions have been developed. These multimedia kiosks on the whole comprise the same components as classic multimedia kiosks but additionally embed a payment terminal which is generally contactless.

Such a multimedia kiosk, also called a payment kiosk with reference to the smaller sized kiosks presented here above, uses for example an NFC (Near Field Communication) type of payment terminal. Concretely, to make payment with such a payment kiosk, the user places his NFC-compatible payment means on a very precise position of the kiosk to make payment for what is displayed on the screen. This may be, for example, payment for an item or a service. It may be for example payment for seats at a show or again a donation to an association. In such certain cases, it may be the payment for an item or article (which is then delivered to an agreed address).

This type of kiosk is complicated to build and implement. Indeed, as a rule, offers of products and services being vended, displayed on the kiosk, are pre-programmed. This means that the offers are either directly integrated into a mass storage memory of the kiosk or downloaded from a dedicated server through a communications network. Offers of items or services being vended (also simply referred to as "offers") are recorded on the dedicated server which has a certain number of offers available for a given kiosk. Upon request, the server transmits one or more offers to a proprietary application which is executed on the kiosk. The dedicated application has the specific features of the kiosk (screen size, number of payment terminals) at its disposal and adapts the content of the offers to the kiosk in question.

Such a construction greatly hampers the development of such kiosks and does so for at least two reasons. First of all, it requires the use of a dedicated application. This dedicated application, installed on the kiosk itself, must be specifically built for this kiosk or at least specially compiled (and/or parametrized) for this kiosk. It is this application that knows the size of the screen, the number of payment kiosks present and their operation. This means that, for a large number of kiosks, the operator (of these kiosks) must have specialized operating software for fleets of machines, comprising a management of a specific configuration. Now, such solutions are costly. When new functions appear in the components installed in the kiosks, the application in question needs to be redeveloped so that it can take account of these new functions.

There is therefore a need to provide a simple, efficient and widely useable solution to simplify the implementing of payment kiosks.

3. SUMMARY

The invention does not raise these problems of the prior art. More particularly, the invention provides a simpler solution to the problems identified here above. Indeed, the present technique can be used to provide a solution for integrating payment terminals in a simpler payment kiosk that is less costly and more efficient than existing solutions.

More specifically, the present technique relates to a method for processing a payment transaction, a method implemented by an autonomous electronic device for the processing of payment transactions, called a payment kiosk, said payment kiosk comprising a processor connected to at least one rendering means for rendering offers of items or services being vended and linked to at least one communications interface and to at least one contactless payment terminal. Such a method comprising:
  a step for the transmission, by a browser installed within said payment kiosk, of a request for obtaining contents made to a contents server;
  a step for the reception, by said browser, coming from the contents server, of an HTML content comprising at least one payment tag;
  a step for processing said HTML content, delivering a view of said HTML content on said at least one rendering means;
  a step for the preparation, by anticipation, by the contactless payment terminal, of at least one payment transaction as a function of data attributes of said at least one payment tag.

Thus, the content is associated with a standardized HTML payment tag that enables the browser to communicate with a payment terminal and initiate a payment transaction.

According to one particular characteristic, the request for obtaining content comprises at least one piece of data for identifying a payment kiosk.

Thus the server is capable of identifying the contents that are intended for this payment kiosk.

According to one particular characteristic, the step for processing HTML content comprises a step for the determining, within the view to be rendered, of a location of a piece of data representing the payment tag as a function of position of a contactless antenna of said at least one payment terminal within said payment kiosk.

Thus, the payment tag is clearly identifiable by the user who knows the exact position at which he must position his payment means to carry out the payment. This is the advantage of the use of a tag: the browser is responsible for the rendered HTML content and therefore for the tag: the browser adapts the positioning of the tag to the configuration of the screen.

According to one particular characteristic, said payment tag comprises at least one attribute defining the offer.

According to one particular embodiment, said attribute defining the offer is an offer-locating address in a transaction server, said locating address comprising a parameter for identifying the offer and at least one identifier of a payment terminal belonging to said payment kiosk.

According to one particular characteristic, the method comprises a step for cancelling said at least one payment transaction, said step for cancelling being implemented when a duration of display of the offer is equal to a determined time parameter and when no payment has been made during the period of time starting at the end of the preparation of the transaction and finishing at the time defined by said time parameter.

Thus, periodically, it is possible to reiterate transactions that have been opened. Advantageously, the time parameter corresponds to the maximum duration of opening of the transaction with the transaction server.

According to one particular embodiment, the method comprises the following steps, prior to the step of reception by the browser of the content comprising said at least one payment tag at the contents server:
  a step for receiving the request coming from the browser;
  a step of identification, by means of this request, of said payment kiosk delivering an identifier of said payment kiosk;
  a step for the obtaining, within a database, as a function of the identifier, of a content to be transmitted to said kiosk, said content comprising at least one offer comprising offer parameters;
  a step for the obtaining, for each offer identified in said content, of a pair of pieces of data comprising an identifier of the payment terminal and a piece of encrypted data of the offer;
  the creation, by means of the contents server, of an offer-locating address to a transaction server comprising the identifier of the payment terminal and said piece of encrypted data of the offer;
  the creation, using said content and said offer-locating addresses, of the HTML content comprising one payment tag per offer.

According to one particular embodiment, prior to the step of reception by the browser of the content comprising said at least one payment tag, the method comprises the following at the contents server:
  a step for receiving the request coming from the browser;
  a step of identification, by means of this request, of said payment kiosk delivering an identifier of said payment kiosk;
  a step for the obtaining, within a database, as a function of the identifier of the payment kiosk, of a content to be transmitted to said kiosk, said content comprising at least one offer comprising offer-related parameters;
  an optional step for the obtaining, for each offer identified in the content, with a transaction server, of a piece of data representing a "challenge" associated with the offer;
  a step of creation, from said content and said data on the offer, of the HTML content comprising a payment tag for the offer, comprising the optional challenge.

The invention also relates to an autonomous electronic device for the processing of payment transactions, called a payment kiosk, said payment kiosk comprising a processing server connected to at least one rendering means for rendering offers of items or services being vended and linked to at least one communications interface and to at least one contactless payment terminal. Such a device comprises:
  means of transmission of a request for obtaining content to a contents server, implemented by a browser installed within said payment kiosk;
  means of reception of an HTML content comprising at least one payment tag, addressed to the browser and coming from the contents server;
  means for processing said HTML content, delivering a view of said HTML content on said at least one rendering means;
  means of preparation, by anticipation, by the contactless payment terminal, of at least one payment transaction as a function of data attributes of said at least one payment tag.

According to a preferred implementation, the different steps of the methods of the invention are implemented by one or more software programs or computer program comprising software instructions to be executed by a data processor of a relay module according to the invention and designed to command the execution of different steps of the methods.

The invention is therefore also aimed at providing a program, capable of being executed by a computer or by a data processor, this program comprising instructions to command the execution of the steps of a method as mentioned here above.

This program can use any programming language whatsoever and be in the form of source code, object code or intermediate code between source code and object code such as in a partially compiled form or in any other desirable form whatsoever.

The invention is also aimed at providing an information carrier readable by a data processor and comprising instructions of a program as mentioned here above.

The information carrier can be any entity or communications terminal whatsoever capable of storing the program. For example, the carrier can comprise a storage means such as a ROM, for example, a CD ROM or microelectronic circuit ROM or again a magnetic recording means, for example a floppy disk or a hard disk drive.

Furthermore, the information carrier can be a transmissible carrier such as an electrical or optical signal that can be conveyed via an electrical or optical cable, by radio or by other means. The program according to the proposed technique can especially be uploaded to an Internet type network.

As an alternative, the information carrier can be an integrated circuit into which the program is incorporated, the circuit being adapted to executing or to being used in the execution of the method in question.

According to one embodiment, the proposed technique is implemented by means of software and/or hardware components. In this respect, the term "module" can correspond in this document equally well to a software component and to a hardware component or to a set of hardware and software components.

A software component corresponds to one or more software module programs, one or more sub-programs of a program or more generally to any element of a program or a piece of software capable of implementing a function or a set of functions according to what is described here below for the module concerned. Such a software component is executed by a data processor of a physical entity (terminal, server, gateway, router etc) and is capable of accessing hardware resources of this physical entity (memories, recording media, communications buses, input/output electronic boards, user interfaces etc).

In the same way, a hardware component corresponds to any element of a hardware assembly capable of implementing a function or a set of functions according to what is described here below for the module concerned. It can be a programmable hardware component or a component with an integrated processor for the execution of software, for example, an integrated circuit, a smart card, a memory card, an electronic board for the execution of firmware etc.

Each component of the system described here above implements of course its own software modules.

The different embodiments mentioned here above can be combined with one another to implement the invention.

4. FIGURES

Figure 1B:
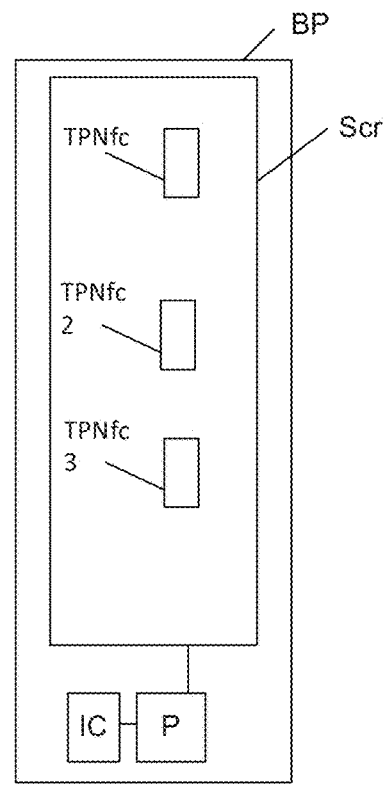
Figure 2:
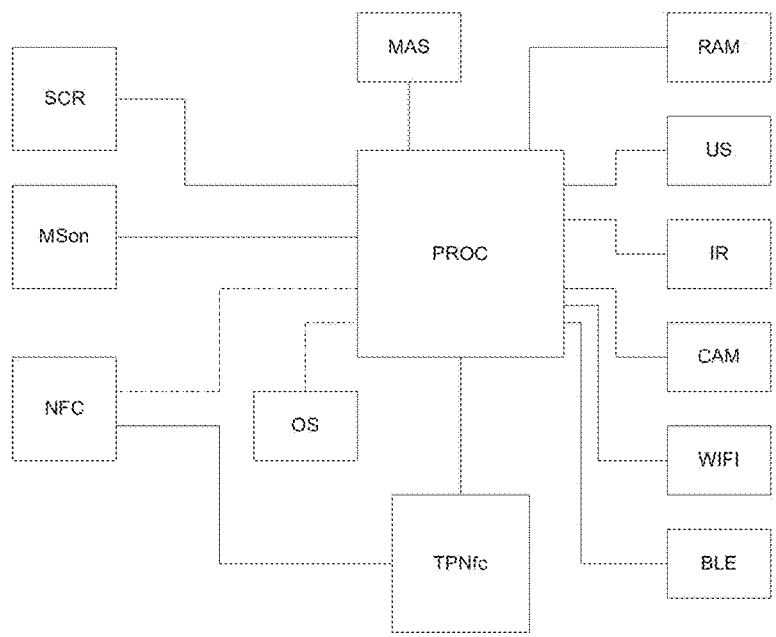
Figure 3:
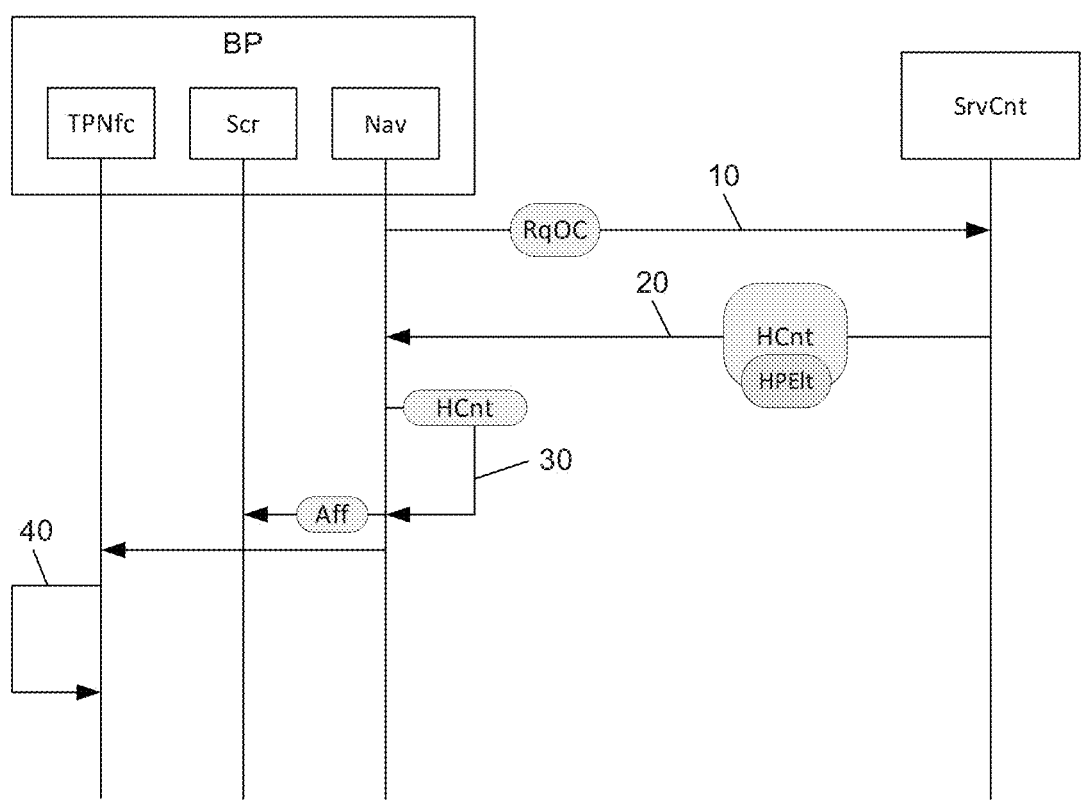
Figure 4:
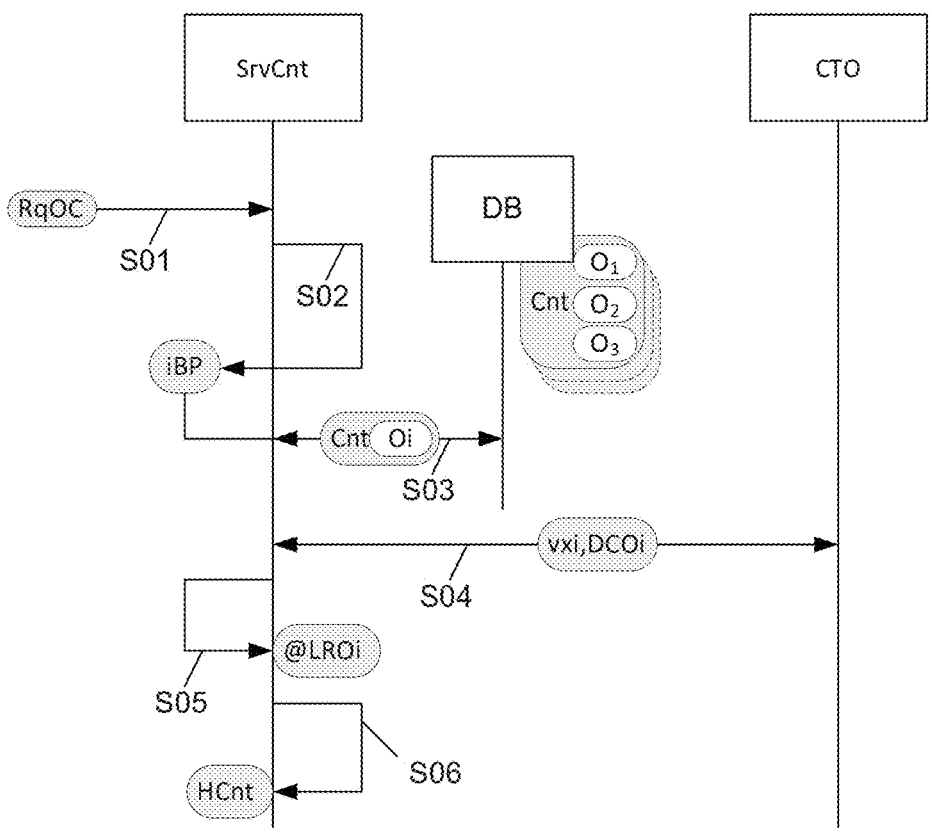
Figure 5:
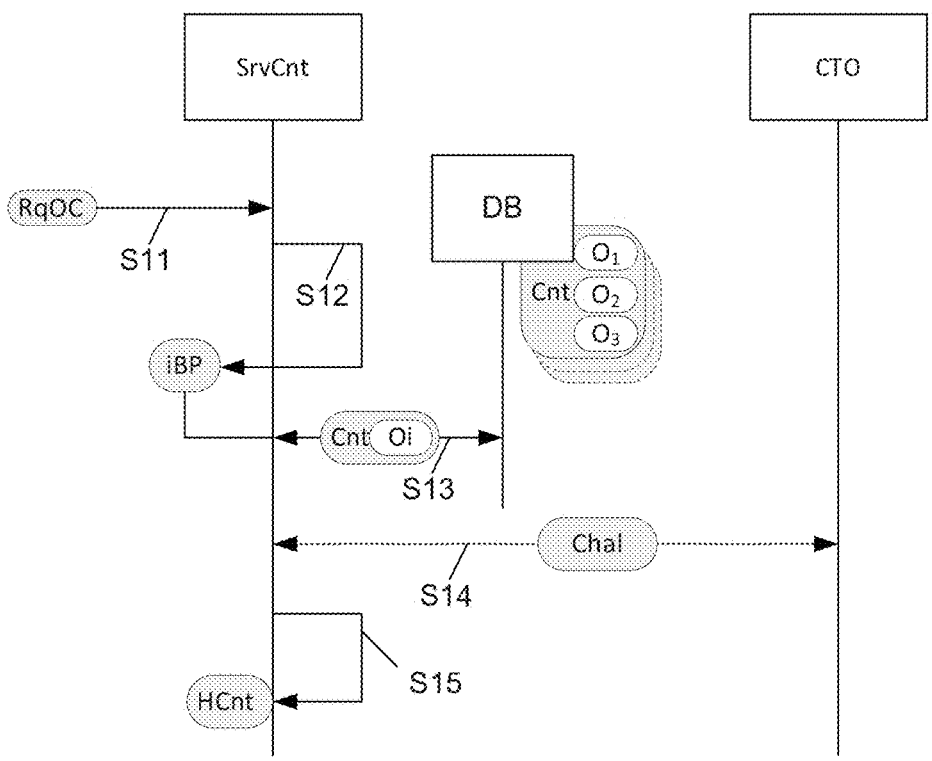

Other features and advantages of the invention shall appear more clearly from the following description of a preferred embodiment, given by way of a simple illustratory and non-exhaustive example and from the appended drawings, of which:

FIGS. 1A and 1B present a payment kiosk that is the object of the present invention;

FIG. 2 presents a more detailed view of the components of such a payment kiosk;

FIG. 3 presents a general view of the obtaining of transaction data by the browser integrated into a payment kiosk that is the object of the present invention;

FIG. 4 describes the implementing of a payment tag in a specific embodiment;

FIG. 5 describes the implementing of a payment tag in another embodiment.

5. DESCRIPTION 5.1 General Description

As explained here above, the technique generally proposes the replacement of the "proprietary" application for implementing the payment kiosk. The application in question is replaced by a browser. This replacement makes it possible to have only a limited number of types of payment kiosk management applications. Essentially, assuming that a payment kiosk can implement a Windows' or a Linux™ system, only two browser versions are needed, one for the Windows' environment and one for the Linux™ environment.

Another advantage is that it leaves the server with the responsibility for displaying offers on the kiosk. Indeed, since the "classic" management application is replaced by a browser, the browser limits itself to displaying data transmitted to it in to a format that is also transmitted to it. Thus, according to the present invention the browser receives an HTML type document from the server to which is attached one or more style-sheets and one or more Javascript code libraries. The adjoining of this data can be achieved by inserting a link to the resources or directly by inserting data into the "HTML" type document.

However, although such an implementation is promising from the technical and economic viewpoint, it cannot resolve all the problems posed. Beyond the problems related to the management of the platform there is also the management of payments made through the kiosk. It may be recalled indeed that the kiosk is capable of making payments through one or more payment terminals directly integrated into the kiosk. The use of a "proprietary" application in a "controlled" environment has the advantage of equally controlled management of the payment terminal. The replacement of this "proprietary" application by a browser brings up problems to be resolved, especially the problem of control over payment terminals and that of the control of the payments to be made.

To resolve this problem, the present technique implements a novel tag, called a payment tag. This tag, which is known to the browser, comprises data on the payment to be made by the kiosk. The working of this tag is described in detail here below. When the kiosk browser receives the HTML type document (coming from the server), it displays this document on the kiosk screen embellished with styles from the style sheets and comprising javascript type code. At least one payment tag is present within this document. This is a payment tag that the browser interprets in order to carry out the actions required by this tag, in connection with the payment terminal or terminals of the kiosk.

Referring to FIGS. 1A and 1B, a payment kiosk according to the present invention is described. Such a payment kiosk takes the form of a housing comprising an information rendering means such as a screen and/or a speaker. The information rendering means is connected by one more data buses to a processor. This processor can be any type of processor usually intended for such tasks such as PC type processors or processors intended for more compact terminals such as SOC (System on Chip) devices. The processor comprises a bus for access to a random-access memory, a bus for access to a mass storage memory, a bus for access to one or more network communications interfaces (Wi-Fi, Bluetooth, RJ45 type interface networks) and one or more buses for access to serial type communications interfaces (USB or Universal Serial Buses). In addition, the processor comprises an access bus for access to at least one communications terminal taking the form of a contactless type payment terminal. Such a contactless type payment terminal comprises a secured processor, a secured memory, and bus for access to an NFC processor, an NFC antenna connected to the NFC processor. The payment terminal can also comprise one or more dedicated communications interfaces. Depending on the embodiments, the communications interfaces of the payment terminal can be shared with the communications interfaces of the processor. The processor and the different modules that form the payment kiosk are run by an operating system. The operating system is of a standard type and can be based on a derivative version of the Linux™ system. It comprises modules for managing the different components of the kiosk with the exception of the payment terminal or terminals. The operating system for its part brings about the operation of a browser adapted to implement the present invention and especially adapted to the management and operation of payment tags. A payment terminal for its part is also run by a proprietary type of system of operating system (this does not change relative to prior art kiosks).

However, the data transmitted to the payment terminal and received from the payment terminal are appreciably different from those of the prior art as shall be explained here below.

Referring to FIG. 2, we present the architecture of a payment kiosk according to the present technique. Such a payment kiosk (BP) comprises a screen (Scr) preferably a touch screen. Such a screen is of a size sufficient for the display of one or more advertisement messages such that they are visible to passersby. Thus, the screen typically has a size ranging from 32-inch diagonal to 55-inch diagonal. A typical advertisement message displayed by such a screen comprises for example a video and/or photographs and/or text.

Depending on the intended environment of the payment kiosk (BM), this kiosk must also include a sound-rendering module (MSon): the sound-rendering module is intended for the production of sounds that may accompany the advertisement messages issued, when such sounds can be perceived by the users.

The screen (Scr) and the sound-rendering module (if present) are connected by one or more data-transport buses to a processor (Proc). Such a processor (Proc) has sufficient processing capacity to carry out various multimedia processing tasks such as for example the display of a quality video and/or the display of images of higher resolution. The processor (Proc) is furthermore capable of receiving data by means of data transportation buses connecting the processor (Proc) to the NFC module (if it is not directly managed by the integrated payment terminals) or again to the wireless communications modules (such as for example the Wi-Fi module or the Bluetooth BLE module).

The processor (Proc) is furthermore connected optionally by means of a data bus to sensors (ultrasound (US) sensors, infrared (IR) sensors or again a camera (CAM)) to receive signals sent by these sensors in order to detect, as the case may be, the presence of one or more users. These signals are converted by the processor and given to the operating system (OS). The processor also has a random-access memory (RAM) and a mass storage memory (MAS).

The operating system takes charge of executing the browser and managing the data exchanges between the different components and the browser. In other embodiments, the payment kiosk can take the form of a computer, tablet or smartphone type of terminal that embeds components identical or similar in their functions and capable of implementing the methods described herein, in which case the term 'payment kiosk' will be replaced by a more suitable expression.

Referring to FIG. 3, we describe the general operation of a payment kiosk in carrying out a payment. In a first stage, the payment kiosk must receive data to be displayed and information on payments from the server. The method implemented on this occasion is the following:
- a step of transmission (10) to the contents server (SrvCnt) of a request for obtaining content (RqOC), said request for obtaining content comprising at least one piece of identification data (iBP) for identifying the payment kiosk;
  - this request is implemented from the kiosk; i.e. the kiosk that is the party requesting the data to be displayed, and this is done to enable an accurate implementation of payment as explained here below;
- a step for receiving (20) at least one HTML content (HCnt) to be displayed, coming from the contents server (SrvCnt), said content comprising at least one payment tag (HPElt);
- a step for processing (30) said HTML content (HCnt) delivering a view (Aff) of said HTML content (HCnt) on said at least one rendering means (Scr) comprising especially the display of said content by said browser, data representing the payment tag being displayed in proximity to an NFC antenna of a payment terminal of the payment kiosk.

In a complementary way, the content of the HTML type document also comprises a piece of data representing a time of display of the content. When this time of display has elapsed, the above method is again executed in order to display a new content on the screen. The object of this last step is two-fold: on the one hand it makes it possible not to permanently allow the display of "static" content which would have the consequence firstly of reducing the service life of the display device and secondly of having a relatively disappointing effect (due essentially to the fact that a fixed display does not attract the eye and therefore does not highlight the value of the goods and services on offer as displayed on the kiosk).

In a second stage, subsequent to or at the same time as the display of the content on the screen, the payment terminal prepares (40) the transaction or transactions to be performed in advance (by anticipation). The number of transactions prepared depends firstly on the number of payment terminals installed in the kiosk and secondly on the number of tags present in the content. For example, if there are four payment terminals and only three tags, only three transactions are prepared. Conversely, if three payment terminals are installed in the kiosk and four payment tags are present, only three transactions are prepared. The preparation of a transaction (in advance, i.e. before the user shows an intention of purchasing an item or a service) has two purposes: firstly not to have to detect the presence of the user (to initiate the transaction) and secondly to enable immediate payment (during the use of the payment means by the user).

The preparation of a transaction is essentially performed by means of the payment tag (or tags) contained in the HTML document.

A payment tag according to the present invention is essentially an instruction intended for the browser, enabling the browser to prepare the transaction and to do so whatever the nature of the transaction. A payment tag is so to speak a universal interface between the server that transmits the content and the payment terminal. The payment tag is implemented in conjunction with the browser. The payment tag on the whole takes the following form:

The payment tag comprises a plurality of attributes, including the usual attributes of identification ("id", "name", "image") and styles enabling the display of a content of the tag when necessary. The payment tag also has specific data attributes used to prepare the payment transaction. Essentially two methods, either mutually exclusive or complementing each other (depending on the implementation), are used to prepare the transaction.

The following are the possible attributes of the tag:
link: specifies an address of location of the transaction data; this is an attribute used to obtain the transaction data from a location different from that of the content;
amount: specifies the amount of the transaction;
currency: specifies the currency of the transaction;
merchant: specifies parameters of the merchant;
  the merchant's parameters can be (and most often are) encrypted: it is up to the payment terminal to decrypt these pieces of information using data of which it has knowledge;
challenge: specifies a challenge: the challenge comes for example from a remote server, different from the contents server, and enables the payment terminal to make a mutual authentication, for example before payment, when the transaction is prepared.

When the data has been displayed and when the payment terminals of the kiosk have prepared the transactions (by anticipation), the users can make payments by placing their payment means at positions indicated by the payment tag, of which at least certain data elements (for example the price and/or a contactless payment logo) are displayed on the screen.

Two events can occur following the preparation of the transaction: either the payment is carried out by a user for one of the offers displayed or no payment is made (within a given period of time). In this case, the method comprises a step for cancelling payment transactions (PT#) made in advance, the cancellation being implemented when a duration of display of offer is equal to a determined time parameter and when no payment has been made during the time period starting at the end of the preparation of the transaction and ending at the time defined by said time parameter. If this cancellation occurs, the method previously described (steps 10 to 40) is again implemented, leading to the display of "new" offers and the opening of new payment transactions by anticipation. Ingeniously, the time parameter corresponds to the maximum time during which a transaction opened by anticipation is activated (and/or active) at the level of the transaction server (and/or the server that will process the transaction).

5.2 Implementing a Payment Tag

There are mainly two methods for implementing this payment tag: one uses the link attribute and the other uses the descriptive attributes. The distinction between the implementing of the first method and that of the second method can take account of the physical parameters of the payment kiosk but also of the parameters related to the transaction itself (the amount for example) or again parameters proper to the merchant (who manages a set of payment kiosks). Thus, the implementing of either of these two methods is often pre-defined. Implementing a payment tag enables the payment terminal to create, by anticipation, the transaction or transactions associated with the offers present in the content. This is ingenious, according to the invention, because the advance creation of the transaction enables it to be processed more speedily than it is proposed in prior-art solutions.

5.2.1 First Method of Implementation

In a first method, the payment terminal is provided with the data for preparing the transaction by means of a URL. In this case, the tag uses the "link" attribute which, if it has a value attached to it, comprises a link (a URL) towards a secured resource comprising the transaction data to be prepared. This URL can be an address towards either the contents server (the one that delivers the HTML content to be displayed) or a third-party server (a server of a merchant who is vending the item).

This URL enables for example the kiosk browser (depending on the cryptographic hardware that it embeds) to obtain knowledge of the transaction data and configure the payment terminal to prepare this transaction. However, more efficiently, this URL enables the selected payment terminal to directly obtain knowledge of data concerning the transaction and to get configured accordingly and to authenticate to a transaction server.

Thus, to implement such a method, using the <link> tag according to the present invention, in at least one embodiment, described with reference to FIG. 4, when the browser (Nav) transmits a request for obtaining content to the contents server (SrvCnt), the following method is implemented by the contents server (SrvCnt):

receiving (S01) the request (RqOC) coming from the browser (Nav);

identifying (S02), by means of this request, said payment kiosk (BP) delivering an identifier (iBP) of said payment kiosk;

obtaining (S03), within a database (BD), as a function of the identifier (iBP) of the payment kiosk (BP), a content (Cnt) to be transmitted to said kiosk (BP), said content comprising at least one offer (Oi) comprising offer parameters (a currency, an amount, a date, a duration and parameters of the merchant such as his account number, his bank for example);

obtaining (S04) a pair of pieces of data for each offer (Oi) identified in said content, the pair of pieces of data comprising a payment terminal identifier (vxi) and a piece of encrypted data of the offer (DCOi), this obtaining step comprising:

the transmission of said offer (Oi) to a transaction server (CTO);

the determining, among the payment terminals ((vx1, . . . vx6) of the payment kiosk, of an identifier of the payment terminal (vxi) in charge of a transaction associated with this offer (Oi);

the creation, from the parameters of the offer and/or other parameters, of a piece of encrypted data of the offer (DCOi);

this piece of data is encrypted by means of the public key of the payment terminal in charge (vxi);

when the payment terminal obtains knowledge of this piece of data, it can authenticate it as being generated by the transaction server (see here below);

the attribute "challenge" can also be generated by the transaction server at this time (to enable the payment terminal to take up the challenge generated by the transaction server before preparing the transaction);

the transmission by the transaction server (CTO) to the contents server (SrvCnt) of the pair formed by the identifier of the payment terminal (vxi) and said piece of encrypted data of the offer (DCOi);

the creation (S05), by the contents server (SrvCnt), of an offer-locating address (@LROi) towards the transaction server (CTO), comprising the identifier of the payment terminal (vxi) and said piece of encrypted data of the offer (DCOi);

the creation (S06), on the basis of said content (Cnt) and offer-locating addresses (@LROi), of the HTML content (HCnt) comprising one payment tag (HPElt) per offer (Oi).

This embodiment has the advantage of not requiring the supply of "secret" data to the browser. Indeed, with this method, the browser does not know which are the pieces of data on the offered item. These pieces of data are encrypted and transmitted directly by the browser (and the corresponding API) to the payment terminal, the identifier of which is present in the URL. Thus, even if the browser is compromised (i.e. if it is being monitored in order to impair its operation or to degrade the payment operations), it is not possible to modify the data of the offer, these data being encrypted and can be decrypted only by the payment terminal (vxi) designated for this offer. However, this embodiment has the drawback of making it necessary for the browser to obtain data of the offer from the payment terminal and of therefore requiring additional exchanges between the payment terminal and the browser (exchanges that are of course secured). Thus, this embodiment is more efficient in terms of security but entails greater constraints in terms of implementation.

5.2.2. Second Method of Implementation

A second method of implementation of the payment tag consists in providing the payment terminal with data for preparing the transaction by means of the attributes of the tag (amount, currency, merchant's parameter, date, challenge). In this case, the link attribute is not necessarily used. Besides, the obtaining of data from the contents server (SrvCnt) is different from that of the previous method.

To implement such a method, using tags of the offer, according to the present invention in at least one embodiment described with reference to FIG. 5, when the browser (Nav) transmits a request for obtaining content to the contents server (SrvCnt), the following method is implemented by the contents server (SrvCnt):

receiving (S11) the request (RqOC) coming from the browser (Nav);

identifying (S12), through this request, said payment kiosk (BP), delivering an identifier (iBP) of said payment kiosk;

obtaining (S13), within a database (BD) and as a function of the identifier (iBP) of the payment kiosk (BP), a content (Cnt) to be transmitted to said kiosk (BP), said content comprising at least one offer (Oi) comprising parameters of the offer (currency, amount, date, duration and parameters of the merchant, account number, bank for example);

obtaining (S14), optionally for each offer (Oi) identified in said content, from a transaction server (CTO), a challenge associated with the offer (Oi) comprising:
  the transmission of said offer (Oi) to the transaction server (CTO);
  the creation, using parameters of the offer and/or other parameters, of a piece of encrypted challenge data (DCChi);
  the transmission, by the transaction server (CTO), of said piece of encrypted challenge data (DCCh);

creating (S15), from said content (Cnt) and data of the offer (Oi), of the HTML content (HCnt) comprising a payment tag (HPElt) for the offer (Oi), comprising the optional challenge (DCChi).

This embodiment has the advantage of enabling the browser to directly integrate data on the offers into the view without requiring any decoding. This implementation is less secure than the first one but also more flexible. Indeed, the browser directly obtains knowledge of the data of the offer without having to call upon the payment terminal and can therefore prepare the view more speedily. The payment terminal also receives the offer intended for it from the browser. Using the data received, the terminal sends a request to the transaction server and a series of exchanges takes place in order to enable the authentication of the terminal, the transaction server, the offer. The method implemented comprises the following steps:

a step for the reception, by the payment terminal, of the parameters of the offer: they are transmitted by the browser by means of an API;

a step for obtaining a piece of data representing the transaction server; it can either be stored in a protected memory of the payment terminal or be provided by the browser;

a step for the creation, using parameters of the offer and a private key of the payment terminal, of a piece of encrypted data representing the offer: the payment terminal encrypts the data with its private key and possibly with the public key of the transaction server; thus, only the transaction server having both the public key of the terminal and its private key can decrypt the data transmitted by the payment terminal;

a step for transmitting a processing request to said transaction server, said processing request comprising the piece of encrypted data representing the offer and an identifier of the terminal; and when the transaction server accepts the data transmitted by the payment terminal, a step for the reception, from the transaction server, of a piece of data representing an acceptance of processing of a transaction, for said offer, by the payment terminal.

Thus, only an authentic payment terminal and an authentic transaction server are capable of preparing a transaction that is equally authentic. It can be noted that the use of the payment tag advantageously makes it possible to "pass" data to the payment terminal transparently for the contents server. This makes it possible to have far simpler management of the contents to be transmitted to the payment kiosk: it is no longer necessary to have a "proprietary" content and one of the standardized contents can be used without its having any impact on the security of all the transactions carried out by the payment kiosk.

5.3 Implementing a Payment

The first transaction-preparing method comprises, as explained here above, the use of an address in the "link" tag. This embodiment is implemented rather when the payment terminal has its own communications resources for communications towards the payment and/or merchant servers, for example its own network interface, but this is in no way obligatory. In this embodiment, the payment terminal retrieves the transaction data from a URL of the tag, this URL (a secured URL of the https:// type) being transmitted by the browser. The payment terminal transmits a request to the server which identifies it (for example through the user agent or another parameter added by the terminal to the URL) and verifies (or even provides) the data of the transaction (amount, currency, merchant's parameters, date, challenge).

Using this information, the terminal prepares the transaction, i.e. it initiates the transaction and then awaits a payment. In other words, the terminal acts as if the merchant had requested payment from a customer. The difference is that, in principle, neither the merchant nor the terminal has any piece of data on the presence or non-presence of a potential client. The transaction therefore remains "open" for a pre-determined period of time. As explained, if a customer makes a payment by presenting a payment means before the contactless antenna of the payment terminal, the transaction is validated by a payment terminal of the kiosk. The advantage of this procedure is that the transaction is implemented rapidly and that there is no need to detect the presence of the user (the client) since it is he who reveals his presence by presenting his contactless payment means before the terminal. Thus, this tag and this way of initiating the transaction resolves one of the problems explained here above with the prior-art payment kiosks, namely the need to detect the presence of the user with presence sensors.

In the second transaction-preparing method, the browser configures the payment terminal so that it can prepare the transaction. This embodiment is implemented rather when the payment terminal does not have its own communications resources and when the operating system of the kiosk acts as a gateway towards the servers (payment and/or merchant servers) but this is in no way obligatory. In this embodiment, the browser retrieves the data on the payment tag (amount, currency, merchant's parameters, date, challenge) and forwards this information to the payment terminal by means of an API of the payment terminal, this API being used by the operating system to exchange information with the payment terminal. Otherwise, the method of initializing the transaction is the same as here above and the advantages obtained are identical.

5.4 Running of a Transaction

Since the transaction is prepared (by anticipation), its finalization is simple. All that the user needs to do for this purpose is to place his contactless payment means (contactless card, telephone) at the position shown so that the payment terminal can read the information contained in the payment means and finalize the transaction. To this end, just after the initialization of the transaction, the payment terminal sends out a request for obtaining payment data. This request is sent cyclically so long as the display of the offer to sell the item (i.e. a product or service) remains on display. When the user places his payment means at the place indicated, the payment data are then immediately read by the payment terminal. The payment terminal finalizes the transaction and informs the browser of the finalizing of the transaction through the API of the operating system. Thus, the browser loads a purchase-confirmation content instead of the previously displayed content.

The invention claimed is:

1. A method for processing a payment transaction, the method being implemented by an autonomous electronic device for processing payment transactions, called a payment kiosk, said method comprising:
    transmitting, by a browser installed within said payment kiosk, a request for obtaining content to a contents server, said payment kiosk comprising a processor connected to at least one rendering device for rendering offers of items or services being vended and linked to at least one communications interface and to at least two contactless payment terminals;
    receiving, by said browser, an HTML content representative of at least two offers from the contents server, the HTML content comprising one payment tag per offer included within said HTML content;
    processing said HTML content including delivering a view of said HTML content on said at least one rendering device; and
    preparing, by anticipation, at least two payment transactions, each of said at least two payment transactions being associated with one of said at least two offers included within said HTML content, wherein:
        a number of the payment transactions prepared depends on a number of the contactless payment terminals installed within the payment kiosk and a number of payment tags present in the HTML content; and
        preparing the at least two payment transactions comprises, for each of said at least two payment transactions, configuring a different one of said at least two contactless payment terminals as a function of data attributes of the payment tag of the offer associated with said payment transaction,
    wherein:
        a challenge from a transaction server enables the payment terminal to make a time limited mutual authentication before a payment is initiated:
        completing the transaction when a payment is initiated before the time limited mutual authentication expires; and
        cancelling the transaction when a payment is not initiated before the time limited mutual authentication expires.

2. The method according to claim 1, wherein the request for obtaining content comprises at least one piece of data for identifying a payment kiosk.

3. The method according to claim 1, wherein processing said HTML content comprises determining, within the view to be rendered, a location of a piece of data representing the payment tag as a function of a position of a contactless antenna of said at least two payment terminals within said payment kiosk.

4. The method according to claim 1, wherein said payment tag comprises at least one attribute defining the offer.

5. The method according to claim 4, wherein said attribute defining the offer is an offer-locating address in a transaction server, said locating address comprising a parameter for identifying the offer and at least one identifier of a payment terminal belonging to said payment kiosk.

6. The method according to claim 1, further comprising cancelling said at least one payment transaction, said cancelling being implemented when a duration of display of the offer is equal to a determined time parameter and when no payment has been made during a period of time starting at an end of preparing at least one payment transaction and finishing at a time defined by said time parameter.

7. The method according to claim 1, further comprising creating said HTML content at the contents server comprising:
    receiving the request from the browser;
    identifying, by using the request, said payment kiosk, delivering an identifier of said payment kiosk;
    obtaining, within a database, as a function of the identifier, a content to be transmitted to said kiosk, said content comprising at least one offer comprising offer parameters;
    obtaining, for each offer identified in said content, of a pair of pieces of data comprising a payment terminal identifier and a piece of encrypted data of the offer;
    creating, using the contents server, of an offer-locating address to a transaction server comprising the payment terminal identifier and said piece of encrypted data of the offer; and
    creating, using said content and offer-locating addresses, the HTML content comprising one payment tag per offer.

8. The method according to claim 1, further comprising creating the HTML content at the contents server comprising:
    receiving the request coming from the browser;
    identifying, by using the request, said payment kiosk delivering an identifier of said payment kiosk;
    obtaining, within a database, as a function of the identifier of the payment kiosk, a content to be transmitted to said kiosk, said content comprising at least two offers comprising offer-related parameters; and
    creating, from said content and said offer-related parameters, the HTML content comprising a payment tag per offer.

9. The method according to claim 8, wherein the HTML content further comprises a piece of data representing a "challenge" associated with the offer, said piece of data representing the "challenge" associated with the offer being obtained with a transaction server, after obtaining the content to be transmitted to the kiosk.

10. An autonomous electronic device for processing payment transactions, called a payment kiosk, said payment kiosk comprising:
    at least one rendering device;
    at least one communications interface;
    at least two contactless payment terminals;
    a processor connected to the at least one rendering device for rendering offers of items or services being vended and linked to the at least one communications interface and to the at least two contactless payment terminals; and a non-transitory computer-readable medium comprising instructions stored thereon, which when executed by the processor configure the payment kiosk to perform acts comprising:

transmitting a request for obtaining content to a contents server, implemented by a browser installed within said payment kiosk;

receiving an HTML content representative of at least two offers, the HTML content comprising one payment tag per offer included within said HTML content, the HTML content being addressed to the browser and coming from the contents server;

processing said HTML content including delivering a view of said HTML content on said at least one rendering device;

preparing, by anticipation, by the contactless payment terminal, at least two payment transactions, each of said at least two payment transactions being associated with one of said at least two offers included within said HTML content, wherein:

a number of the payment transactions prepared depends on a number of the contactless payment terminals installed within the payment kiosk and a number of payment tags present in the HTML content; and preparing the at least two payment transactions comprises, for each of said at least two payment transactions, configuring a different one of said at least two contactless payment terminals as a function of data attributes of the payment tag of the offer associated with said payment transaction, wherein:

a challenge from a transaction server enables the payment terminal to make a time limited mutual authentication before a payment is initiated; and the non-transitory computer-readable medium further comprising instructions stored thereon, which when executed by the processor configure the payment kiosk to further perform acts comprising:

completing the transaction when a payment is initiated before the time limited mutual authentication expires; and cancelling the transaction when a payment is not initiated before the time limited mutual authentication expires.

11. A non-transitory computer-readable medium comprising a computer program product stored thereon, which comprises program code instructions configured so that, when the instructions are executed by a processor of an autonomous electronic device, called a payment kiosk, a method of processing payment transactions is performed comprising:

rendering on at least one rendering device of the payment kiosk offers of items or services being vended and linked, the processer being connected to the at least one rendering device and linked to at least two contactless payment terminals of the payment kiosk;

transmitting, by a browser installed within said payment kiosk, a request for obtaining contents to a contents server;

receiving, by said browser, an HTML content representative of at least two offers from the contents server, the HTML content comprising one payment tag per offer included within said HTML content;

processing said HTML content including delivering a view of said HTML content on said at least one rendering device;

preparing, by anticipation, at least two payment transactions, each of said at least two payment transactions being associated with one of said at least two offers included within said HTML content, wherein:

a number of the payment transactions prepared depends on a number of the contactless payment terminals installed within the payment kiosk and a number of payment tags present in the HTML content; and preparing the at least two payment transactions comprises, for each of said at least two payment transactions, configuring a different one of said at least two contactless payment terminals as a function of data attributes of the payment tag of the offer associated with said payment transaction, wherein:

a challenge from a transaction server enables the payment terminal to make a time limited mutual authentication before a payment is initiated:

completing the transaction when a payment is initiated before the time limited mutual authentication expires; and cancelling the transaction when a payment is not initiated before the time limited mutual authentication expires.

* * * * *